Oct. 13, 1959    M. CANZIER    2,908,323
AUTOMOBILE FOOT AND LEG REST
Filed Oct. 4, 1956    2 Sheets-Sheet 1

Michael Canzier
       INVENTOR.

BY *Clarence A. O'Brien*
*and Harvey B. Jacobson*
                Attorneys

Oct. 13, 1959    M. CANZIER    2,908,323
AUTOMOBILE FOOT AND LEG REST
Filed Oct. 4, 1956    2 Sheets-Sheet 2
Fig. 2
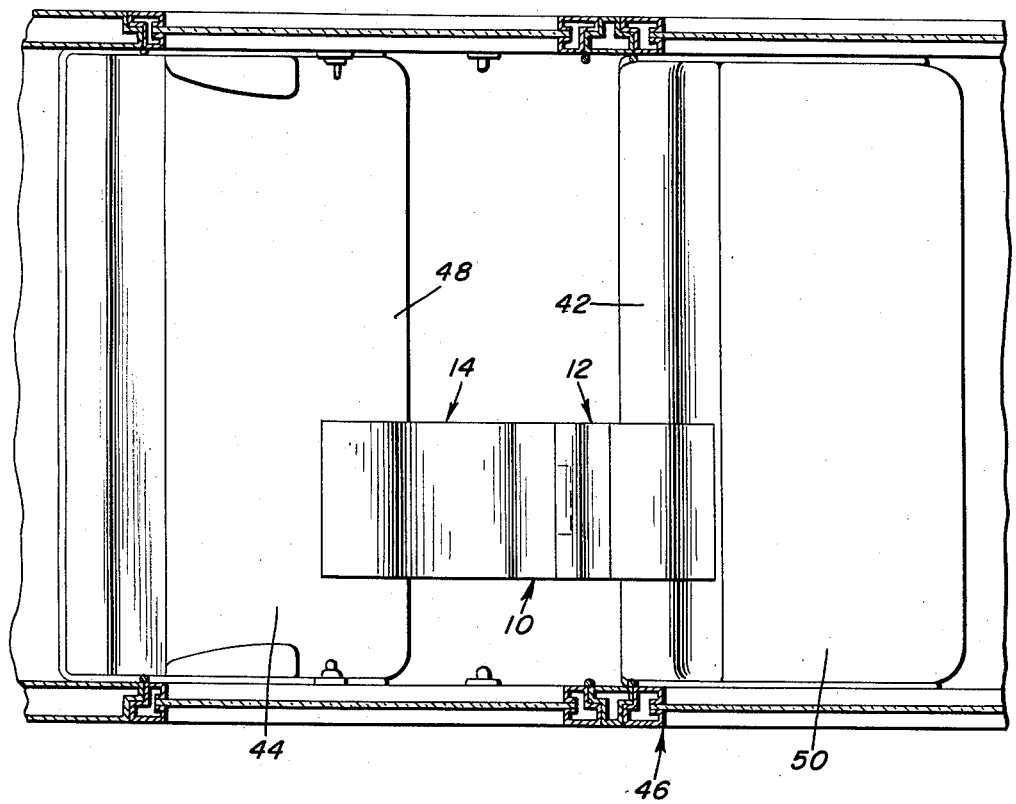
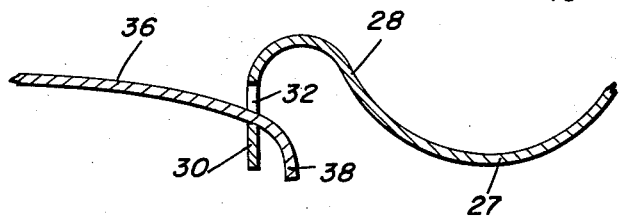
Fig. 4
Michael Canzier
INVENTOR.
BY
Attorneys

United States Patent Office 2,908,323
Patented Oct. 13, 1959

2,908,323

AUTOMOBILE FOOT AND LEG REST

Michael Canzier, Garrett, Ind.

Application October 4, 1956, Serial No. 613,956

7 Claims. (Cl. 155—165)

This invention relates in general to new and useful improvements in supports, and more specifically to a foot and leg rest for use in conjunction with automobile seats.

Because of the relatively small space provided between the rear seat and the front seat of an automobile there is insufficient room for one to properly stretch his or her legs and as a result on a long trip the riders in the rear seat may become extremely tired, particularly due to leg cramp. It is therefore the primary object of this invention to provide an improved foot and leg rest which may be mounted within a vehicle between a front seat back and a cushion portion of the rear seat in position for supporting the legs and feet of a rider of the rear seat.

Another object of this invention is to provide an improved foot rest for use in conjunction with automobile seats, the foot rest being intended to be mounted on a front seat back and being of the type to snap over the upper part of the front seat back and having surfaces for the engagement of shoes of a rider of the rear seat.

Another object of this invention is to provide an improved foot and leg rest for automobiles, the foot and leg rest being of an extremely simple construction and being made in two sections whereby it may be readily stored.

A further object of this invention is to provide an improved foot and leg rest for automobiles, the foot and leg rest including a foot rest portion engageable over the upper part of a front seat back and intended to engage the shoes of a rear seat rider, there also being a separate leg rest which is supported by the foot rest and which has the rear part thereof engaged with the cushion of the rear seat, the leg rest being upwardly bowed in order to provide proper support for one's legs.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2 is a fragmentary horizontal sectional view taken through the automobile of Figure 1 and shows the foot and leg rest in plan;

Figure 4 is an enlarged sectional view taken through the juncture between the two sections of the foot and leg rest and shows the details of the connection therebetween.

Figure 1:
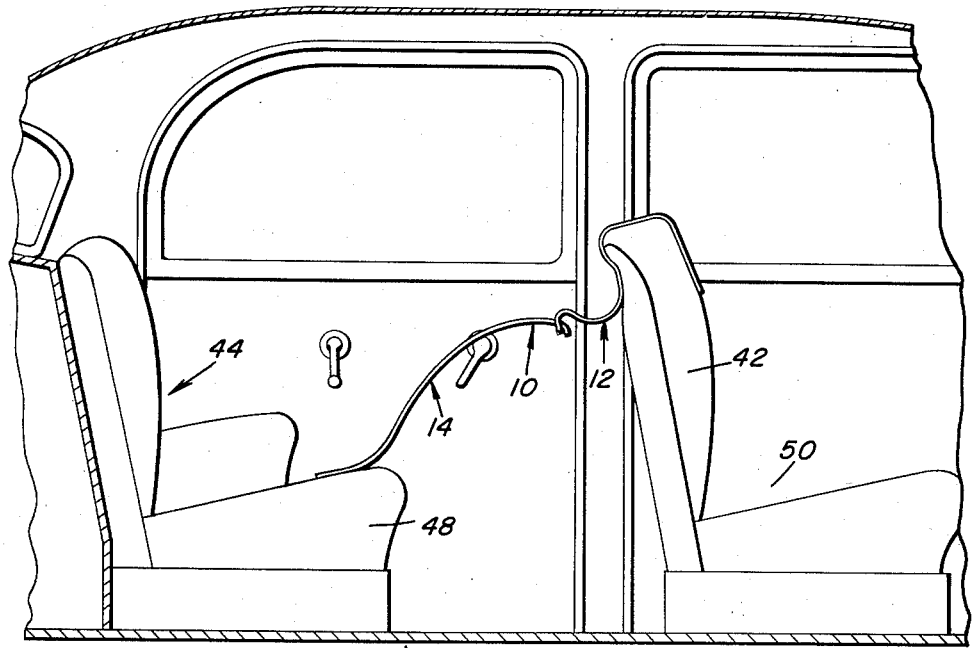
Figure 1 is a fragmentary sectional view taken through an automobile body of the four-door type and shows the position between the front and the rear seat thereof a foot and leg rest which is the subject of this invention.
Figure 3:
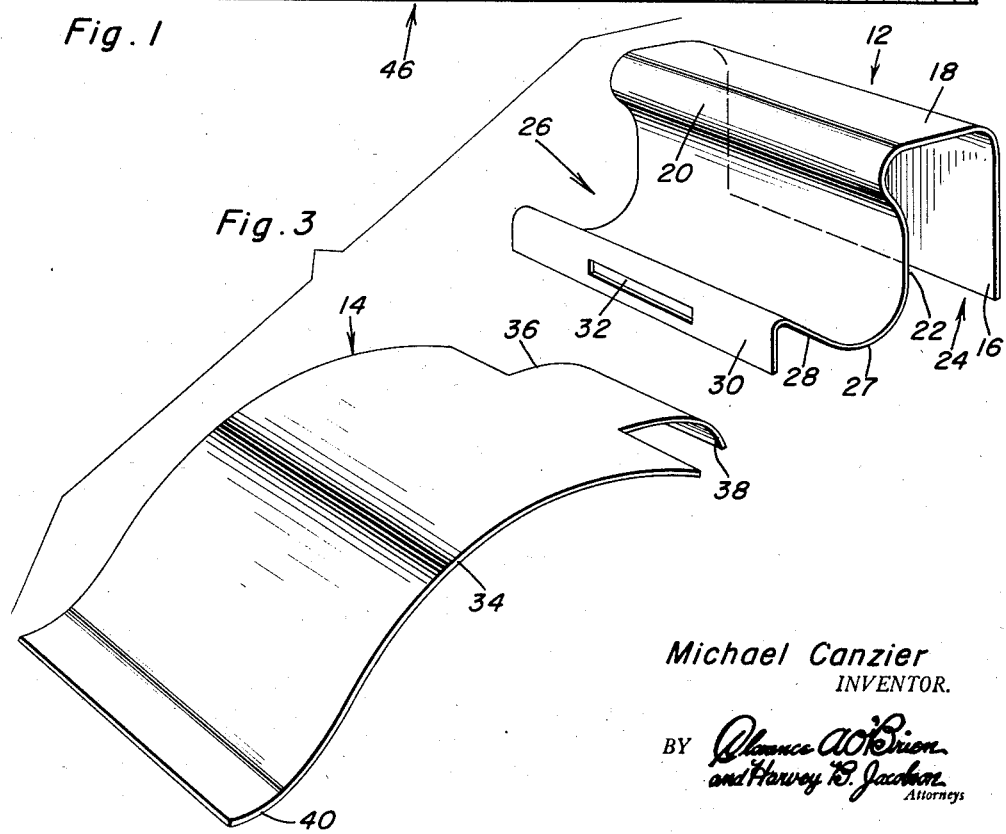
Figure 3 is an enlarged exploded perspective view of the foot and leg rest and shows the general details of the two sections thereof.

Referring now to the drawings in details, it will be seen that there is illustrated the foot and leg rest which is the subject of this invention, the foot and leg rest being referred to in general by the reference numeral 10. The foot and leg rest 10 is formed in two sections, the first section being in the form of a foot rest referred to in general by the reference numeral 12. The second section is in the form of a leg rest which is referred to in general by the reference numeral 14.

The first section 12 is formed of sheet material and includes a forward vertical flange 16 which terminates in a horizontally rearwardly extending flange 18. Disposed at the rear edge of the flange 18 is an upwardly and rearwardly extending rounded projection 20 which terminates in a downwardly extending flange 22 which is disposed generally parallel to the flange 16 and spaced rearwardly thereof. The flanges 16, 18 and 22 and the projection 20 form a downwardly opening forward portion which will be referred to in general by the reference numeral 24.

The foot rest 12 also includes an upwardly and rearwardly opening rear portion 26. The rear portion 26 is bordered by the flange 22, a lower curved portion 27 and a rearwardly directed flange 28.

The foot rest 12 also includes a depending rear flange 30. The rear flange 30 is used for the attachment of the rear section or leg rest 14. The flange 30 includes a centrally located slot 32. The leg rest 14 is in the form of an elongated sheet which includes an upwardly bowed body portion 34. The forward end of the body portion 34 is in the form of a reduced tongue 36 which has a downwardly curved forward part 38. The body portion 34 terminates in a generally flat seat engageable portion 40.

In the use of the foot and leg rest 10, the foot rest 12 is snapped over a back of a vehicle seat, such as the seat back 42. The proper position of the foot support 12 with respect to the seat back 42 is best illustrated in Figure 1. When the foot rest 12 is properly positioned on the seat back 42, a person seated on the rear seat 44 of the vehicle 46 may place his shoes on the foot rest 12 preferably with the heels of his shoes in the rearwardly and upwardly opening portion 26 and the soles engaging the projection 20.

The foot rest 12 may be used independently of the leg rest 14. However, the leg rest 14 must be used in conjunction with the foot rest 12 inasmuch as the forward part of the leg rest 14 is supported by the foot rest 12.

When the leg rest 14 is utilized, the tongue 36 is passed through the slot 32 of the flange 30. Thus the forward end of the leg rest 14 is interlocked with the rear part of the foot rest 12 and is supported thereby. The seat engaging portion 40 of the leg rest 14 is engaged upon the forward part of the cushion 48 of the rear seat 44.

As is best illustrated in Figure 1, when the entire foot and leg rest 10 is utilized, the legs of one seated on the rear seat 44 are supported by the leg rest 14 and the feet of the same person are properly supported by the foot rest 12. By using this particular arrangement of supports, it will be readily apparent that one seated on the rear seat 44 may comfortably stretch his or her legs in a relaxed position. Also, it will be readily apparent that the foot and leg rest 10 in no way interfere with the comfort of one seated in the front seat 50 of which the seat back 42 is a part.

The foot rest 12 and the leg rest 14 may be formed of light weight material, such as plastics, light weight metals, such as aluminum, etc. It will be readily apparent that the parts of the foot and leg rest may be readily stored beneath the seats or in the trunk of the vehicle 46.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A foot and leg rest for vehicle seats comprising first and second sections, said first section including a sheet having a forward inverted U-shaped portion adapted to be engaged over a vehicle seat back, a rear flange, said second section including a curved panel having a forward attaching flange releasably engaged with said rear flange and a rear seat engaging portion.

2. A foot and leg rest for vehicle seats comprising first and second sections, said first section including a sheet having a forward inverted U-shaped portion adapted to be engaged over a vehicle seat back, a rear flange, said second section including a curved panel having a forward attaching flange releasably engaged with said rear flange and a rear seat engaging portion, said curved panel being upwardly bowed to form a suitable leg support.

3. A foot and leg rest for vehicle seats comprising first and second sections, said first section including a sheet having a forward inverted U-shaped portion adapted to be engaged over a vehicle seat back, a rear flange, said second section including a curved panel having a forward attaching flange releasably engaged with said rear flange and a rear seat engaging portion, said first section including an upwardly and rearwardly opening portion for receiving the heels of a user's shoes.

4. A foot and leg rest for vehicle seats comprising first and second sections, said first section including a sheet having a forward inverted U-shaped portion adapted to be engaged over a vehicle seat back, a rear flange, said second section including a curved panel having a forward attaching flange releasably engaged with said rear flange and a rear seat engaging portion, said forwrd portion including an upper rear, rearwardly projecting part for engaging soles of shoes.

5. A foot and leg rest for vehicle seats comprising first and second sections, said first section including a sheet having a forward inverted U-shaped portion adapted to be engaged over a vehicle seat back, a rear flange, said second section including a curved panel having a forward attaching flange releasably engaged with said rear flange and a rear seat engaging portion, said first section including an upwardly and rearwardly portion for receiving the heels of a user's shoe, said forward portion including an upper rear, rearwardly projecting part for engaging soles of shoes.

6. A foot rest for use in combination with a vehicle seat, said foot rest being formed of sheet material and comprising a forward inverted generally U-shaped portion including a bight portion and a forward and rearward leg, a rounded projection between the bight portion and said rearward leg for engaging soles of shoes, said rounded projection increasing the resiliency of said U-shaped portion and facilitating the clamping action thereof, a semi-cylindrical portion extending from said rearward leg to thereby form an upwardly and rearwardly opening portion for receiving the heels of a user's shoes.

7. A foot and leg rest for vehicle seats comprising first and second sections, said first section including a sheet having a forward inverted generally U-shaped portion including a bight portion and a forward and rearward leg, a rounded projection between the bight portion and said rearward leg for engaging soles of shoes, a semi-cylindrical portion extending from said rearward leg to thereby form an upwardly and rearwardly opening portion for receiving the heels of a user's shoes, a rear flange extending from semi-cylindrical portion, said second section including a curved panel having a forward attaching flange releasably engaged with said rear flange, and a seat engaging portion.

References Cited in the file of this patent

UNITED STATES PATENTS

| | | |
|---|---|---|
| 214,301 | Koehl | Apr. 15, 1879 |
| 280,907 | Burlingame | July 10, 1883 |
| 324,839 | Hazen | Aug. 25, 1885 |
| 866,072 | Salomon | Sept. 17, 1907 |
| 2,455,607 | Price | Dec. 7, 1948 |
| 2,593,319 | Levitin et al. | Apr. 15, 1952 |
| 2,615,503 | Enge | Oct. 28, 1952 |
| 2,642,926 | Diamond | June 23, 1953 |
| 2,688,998 | Erickson et al. | Sept. 14, 1954 |